June 25, 1935.　　　　H. E. HULL　　　　2,005,745
AUTOMOBILE CONTROL DEVICE
Filed June 29, 1932
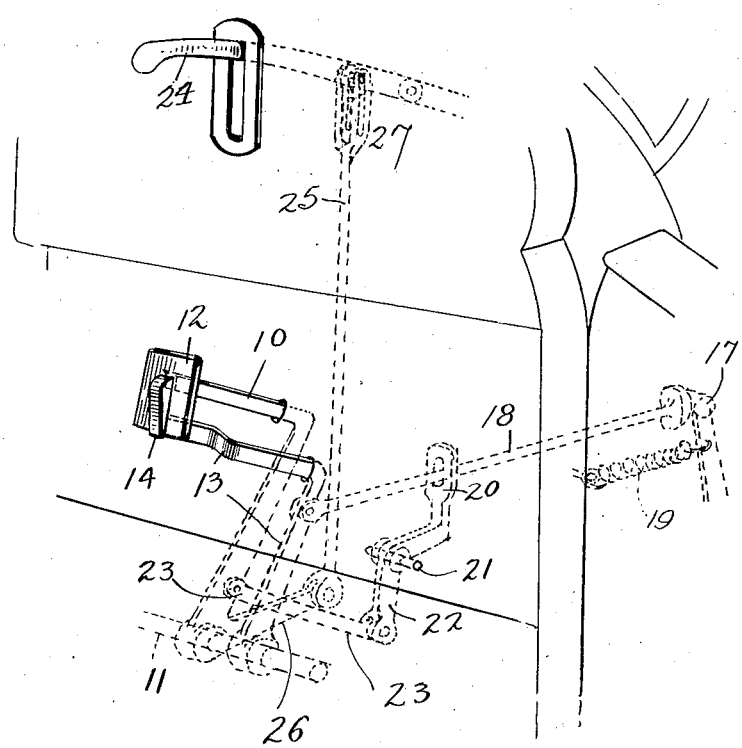
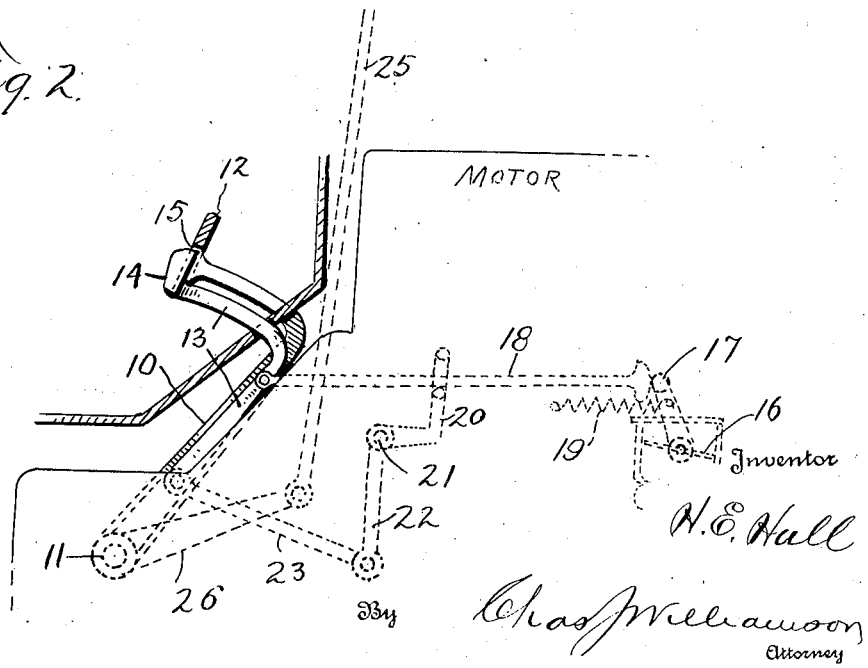

Patented June 25, 1935

2,005,745

UNITED STATES PATENT OFFICE 2,005,745

AUTOMOBILE CONTROL DEVICE

Harry E. Hull, Washington, D. C.

Application June 29, 1932, Serial No. 620,006

19 Claims. (Cl. 192—3)

The object of my invention is to make impossible, or reduce to the minimum, the onward movement of an automobile, or motor vehicle, under conditions when instantaneous and complete stoppage of the vehicle is required, or called for. One of the dangers in running an automobile is that the driver instead of using the instrumentalities to stop the car in an emergency, as under the excitement or stress of the situation, in fact, may actually increase the speed of the car in that he may operate inadvertently the accelerator pedal to supply gas, when the situation actually requires complete cut-off of power. It is a feature of my invention that concurrently or in close sequence, with commencement of operation of the brake pedal, all instrumentalities concerned in moving the car and bringing it to a stop will be controlled so that, for example, the throttle closed and the brakes applied, and free wheeling devices so controlled, that likelihood of coasting or free wheeling will be prevented. A feature of my invention is avoidance of the creation of what is known as a mental hazard in connection with the operation of my invention, so as to render the actions of the driver the natural or accustomed actions in initiating stoppage of the car, and, therefore, actions that are instinctively performed.

As an exemplification of one embodiment of my invention, I utilize the habitual or ordinary foot movement in applying the brakes to accomplish the before stated object of my invention, but my invention consists in whatever is described by or is included within the terms or scope of the appended claims.

In the drawing:

Fig. 1 is a perspective view of enough of an automobile to illustrate an embodiment of my invention;

Fig. 2 is a side elevation thereof with parts in section.

An important feature of my invention is the mounting of the pedal or foot-engaging portions of brake lever and accelerator lever so that no change in position whatever of the foot is necessary, with reference to the pedals, for the application of the brakes so that with the foot upon the accelerator pedal in position for forward movement thereof in the conventional way, with the foot retained thereon forward movement is imparted by the foot for the application of the brakes, and the construction and arrangement are such that concurrently with or immediately following the initial movement of the brake pedal to apply the brakes, the accelerator pedal will be rendered inactive upon the gas throttle and the latter closed to cut off the supply of gas, so that during the application of the brakes and by the time they are applied, the fuel supply through the throttle will be cut off.

Another important feature of my invention is the actuation by connections with the brake pedal of the lever, or other device associated with the free wheeling mechanism by which the transmission is placed in conventional gear, that is to say, in gear with the motor so that in applying the brakes, the braking effect of the motor will be utilized.

Describing in detail what is shown in the drawing, the brake lever 10, is generally of conventional form mounted on a transverse shaft 11, suitably supported from the crank case and having a pedal or foot-engaging portion 12, in the customary position for ready engagement by the right foot of the driver, the pedal being of an area to give a satisfactory bearing of the sole of the foot thereon. The accelerator lever 13, is also mounted on the shaft 11, so that it may rock backward and forward precisely as does the brake lever and it has exposed on the forward side of the brake pedal 12, a pedal or sole-engaging member 14, it being preferably situated in a slot 15, within the brake pedal and preferably at the transverse center thereof so that the sole of the foot when at the brake pedal will bear upon the accelerator pedal 14. When the brake pedal is in non-braking position, the accelerator pedal 14 protrudes sufficiently beyond the face of the brake pedal as to allow all necessary movement of the accelerator pedal by the sole of the foot for controlling the throttle for fuel supply. When the brakes are to be applied, the pedal 14, of course, is pressed far enough forward to bring the adjacent parts of the sole of the foot that lie on each side of the accelerator pedal 14 in contact with the face of the brake pedal 12, whereupon, the usual or conventional movement of the foot for operating the brake pedal will move the brake lever forward and, of course, simultaneously, the accelerator pedal 14 will move forward. Thus, no shifting of the foot whatever is necessary from accelerator operating position to brake-applying position, and the mental hazard which is incident to the necessity for the driver to think of shifting his foot is completely eliminated.

For transmitting forward motion of the accelerator lever 13 to the throttle 16, between the throttle lever 17 and the lever 13, a rod 18 extends forwardly which at its forward end has a loose engagement with the lever 17 so that by shifting the rod 18 upwardly, it may be disengaged from the lever 17, and then by the action of a coil spring 19 attached to the lever 17, the throttle will instantly be closed and the supply of fuel cut off. To enable such upward shifting of the lever 18, it has a pivotal connection with the accelerator lever 13, and it is engageable by one arm 20 of a lever having a pivot 21, between its ends, the other arm 22, of which is in position for engagement by the brake lever 10, connected to it by a link, 23, immediately following its forward movement for application of the brakes, and thereby the rod 18, will be swung upwardly and held in that position until the brake lever is freed from foot pressure and returns to non-braking position. The lever arm 20 may have a slot, as shown, through which the rod 18, passes serving to guide it and limit its vertical movement. And when the arm 20 is at the lower limit of its movement and the rod 18 falls by gravity supplemented by a spring if necessary, the arm is stopped in position for its free end to engage the throttle lever 17, for the usual movement of the throttle by the accelerator pedal.

For control of free wheeling engagement, I connect the device for such control which is in the form of a pivoted lever 24 by a rod 25, with a radial arm 26 of the brake lever 10, so that by the forward movement of the brake lever 10, to apply the brakes simultaneously, the free wheeling control lever 24 will be pulled down and the conventional gear connection will be restored with the motor so that the braking effect of the motor will be utilized. The lever 24 has a handle end that protrudes through a slot in the instrument board for grasping for hand manipulation, if desired, and if that is provided, then there will be a loose or lost motion connection 27 between lever 24 and the rod 25, to allow the independent operation of the control lever 24 by hand.

What I claim is:

1. In combination with an automobile having a foot brake pedal and a pedal with operative connections for an instrumentality concerned in the onward movement of the car, said two pedals being situated for operative contact with the foot of the driver without shifting of the foot in any direction in the plane of the foot-contacting surfaces of the pedals and means operatively connected with the brake pedal that render motion of the other pedal along with the brake pedal ineffective on the device normally actuated by said other pedal.

2. In combination with an automobile having a foot brake pedal and a pedal with operative connections for an instrumentality concerned in the onward movement of the car, said two pedals being situated for operative contact with the foot of the driver without shifting of the foot in any direction in the plane of the foot-contacting surfaces of the pedals and means operatively connected with the brake pedal that render motion of the other pedal along with the brake pedal ineffective on the device normally actuated by said other pedal, the second-hand pedal being an accelerator operating pedal.

3. In combination with an automobile including a foot brake lever, a pedal with operative connections for an instrumentality concerned in the onward movement of the car, said two pedals being situated for operative contact by the same foot of the driver having a pedal and a free wheeling control device and an operative connection between the brake lever and said device which transmits movement from the brake lever to said device when the brake lever is moved to apply the brake that prevents free wheeling.

4. As an improvement in motor vehicle control means, the combination of fuel supply means for the engine having a driver operated control operatively connected therewith, brake operating means and means associated with the brake operating means that disconnects the driver operated control and the fuel supply means following movement of the brake operating means for braking.

5. As an improvement in motor vehicle control means, the combination of fuel supply means for the engine including an accelerator pedal and an operative connection with such means, a brake pedal, such pedals being situated for successive movement in a forward direction and by pressure thereon by the same foot, and the accelerator pedal being independently movable and both having forward movement to increase fuel supply and apply the brakes respectively, and means to render forward movement of the accelerator ineffective on the fuel supply means.

6. As an improvement in motor vehicle control means, the combination of fuel supply means for the engine including an accelerator pedal and an operative connection with such means, a brake pedal, the accelerator pedal having a foot-contacting surface forward of the foot-contacting surface of the brake pedal, both pedals having forward movement to increase fuel supply and apply brakes, respectively, and forward movement of the brake pedal imparting to said operative connection the same kind of movement imparted thereto by the accelerator pedal and means to render such movement ineffective on the fuel supply means.

7. In a motor vehicle control means, the combination of a brake pedal, a throttle controlling pedal, both pedals being situated for engagement by the same foot of the driver and movable together in the direction for opening the throttle, an operating connection between the accelerator pedal and the throttle normally ready to open the throttle and the accelerator pedal being movable for throttle opening independent of the brake-applying movement of the brake pedal and brake pedal operated means acting on brake-applying movement that renders such connection inactive to open the throttle.

8. A mechanism as in claim 7 in which the accelerator pedal is movably mounted on the brake pedal.

9. A mechanism as in claim 7 in which the operative connection between the accelerator pedal and the throttle is laterally movable to render it ineffective to open the throttle and means actuated by the brake applying movement of the brake pedal to cause such lateral movement.

10. As an improvement in motor vehicle control means, the combination of fuel supply means for the engine, a pedal, means to transmit movement from the pedal to such fuel control means movable into and out of operative position, a brake pedal engageable, by the same foot of the driver while in normal brake-applying position and means operated by the brake pedal on its brake applying movement that act on said means for transmitting motion to said fuel supply means from its said pedal that control the action of said fuel supply means by its said pedal.

11. An automobile having a free-wheeling mechanism including a hand lever accessible from the driver's seat for controlling the free-wheeling mechanism and having brake mechanism including a pedal and an operative connection between the pedal and said hand lever that moves the hand lever to cut out free-wheeling when the brake pedal is operated to apply the brake and which allows independent movement of said hand lever for manual operation.

12. In combination with an automobile having a gas engine and having two instrumentalities, operatively concerned in the onward movement of the car at least one being operative on the engine, pedal means situated for movement by forward pressure thereon of the foot of the driver on the car seat, operative connections between said pedal means and both said instrumentalities transmitting simultaneously operative movement to both as soon as said pedal movement is initiated, and automatic means that renders inactive the operative connection with one of said instrumentalities, said pedal means continuing in operative connection with the other instrumentality.

13. A combination as in claim 12 in which one of the instrumentalities is an accelerator.

14. In combination with an automobile having a gas engine and equipped with two instrumentalities operatively concerned in onward movement of the car, one an accelerator, pedal means adapted on forward movement of the driver's foot to render both means effective, operative connections between the pedal means and each instrumentality that allow operation of one independent of the other, and means that render one of said instrumentalities inoperative following forward movement of the pedal means with the foot in the same pedal means engaging position, whereby without shifting the foot's position, both instrumentalities may first be operated and thereafter only one operated.

15. In combination with an automobile having a foot brake pedal and a pedal with operative connections for an instrumentality concerned in the onward movement of the car, said two pedals being situated for operative contact with the foot of the driver without shifting of the foot in any direction in the plane of the foot-contacting surfaces of the pedals, means operatively connected with the brake pedal that render motion of the other pedal along with the brake pedal ineffective on the device normally actuated by said other pedal, free-wheeling means, a free-wheeling control lever, and an operative connection between the same and the brake pedal that moves said free-wheeling lever to prevent free-wheeling.

16. As an improvement in motor vehicle control means, the combination of fuel supply means for the engine, a brake pedal, an accelerator pedal mounted for engagement by the foot simultaneously with the brake pedal, a thrust-form motion transmitting device acted on directly by the accelerator pedal for increasing fuel supply and brake pedal actuated means rendering the accelerator pedal thrust device inactive following brake-applying movement of the brake pedal.

17. Mechanism as in claim 16 in which the accelerator pedal is mounted on the brake pedal and brake-applying movement of the brake pedal causes forward movement of the thrust motion transmitting device.

18. As an improvement in motor vehicle control means, the combination of fuel supply means for the engine having a driver operated control operatively connected therewith, brake operating means and means associated with the brake operating means that disconnects the driver operated control and the fuel supply means following movement of the brake operating means for braking.

19. As an improvement in motor vehicle control means, the vehicle having fuel supply means for the engine and brake mechanism, accelerator and brake pedals situated for engagement by the same foot and being movable forwardly by the same foot to increase fuel supply and apply brakes respectively, and both pedals having a form and position to be engaged and acted on by the foot without changing the position of the foot with reference to the brake pedal, an alterable operative connection between the accelerator pedal and the fuel supply means transmitting such forward movement of the accelerator pedal to increase fuel supply, and means deriving movement from such forward movement of the brake pedal that change said operative connection between accelerator pedal and fuel supply means.

HARRY E. HULL.